(12) United States Patent
Civilini (10) Patent No.: US 7,457,725 B1
(45) Date of Patent: Nov. 25, 2008

(54) ELECTRONIC COMPONENT RELIABILITY DETERMINATION SYSTEM AND METHOD

(75) Inventor: Massimo Civilini, Mountain View, CA (US)

(73) Assignee: Cisco Technology Inc., San Jose, CA (US)

( * ) Notice: Subject to any disclaimer, the term of this patent is extended or adjusted under 35 U.S.C. 154(b) by 416 days.

(21) Appl. No.: 10/603,382

(22) Filed: Jun. 24, 2003

(51) Int. Cl.
*G06F 11/00* (2006.01)
*G06F 15/00* (2006.01)
*G06F 17/18* (2006.01)
*G21C 17/00* (2006.01)

(52) U.S. Cl. .................. 702/183; 702/59; 702/181; 709/226

(58) Field of Classification Search .............. 702/181, 702/183, 59; 709/226
See application file for complete search history.

(56) References Cited

U.S. PATENT DOCUMENTS

| | | | |
|---|---|---|---|
| 5,715,180 A * | 2/1998 | Hu .......................... | 702/108 |
| 5,740,380 A * | 4/1998 | LaBerge et al. ............. | 710/107 |
| 5,802,592 A * | 9/1998 | Chess et al. ................. | 711/164 |
| 5,937,165 A * | 8/1999 | Schwaller et al. ........... | 709/224 |
| 5,974,363 A * | 10/1999 | Gammel et al. ............. | 702/117 |
| 6,199,018 B1 * | 3/2001 | Quist et al. ................. | 702/34 |
| 6,385,739 B1 * | 5/2002 | Barton et al. ................ | 714/25 |
| 6,516,282 B2 * | 2/2003 | Hedlund et al. ............. | 702/132 |
| 6,671,647 B2 * | 12/2003 | Ishii et al. ................... | 702/136 |
| 6,684,349 B2 * | 1/2004 | Gullo et al. ................... | 714/47 |
| 2002/0194160 A1 * | 12/2002 | Garrow et al. ............... | 707/2 |
| 2004/0044499 A1 * | 3/2004 | House et al. ................. | 702/181 |

OTHER PUBLICATIONS

Seagate Technology, "Estimating Drive Reliability in Desktop Computers Consumer Electronics Systems", Oct. 20, 2002, http://www.digit-life.com/articles/storagereliability/.*
"SRAM Module; Mean Time Between Failure Analysis (MTBF)," Hybrid Memory Products LTD, Feb. 1999, 11 pages.
"Reliability Prediction of Board-Mounted Power Modules," Tyco Electronics, Technical Note, Jul. 1997, 6 pages.

* cited by examiner

*Primary Examiner*—Eliseo Ramos-Feliciano
*Assistant Examiner*—Janet L Suglo
(74) *Attorney, Agent, or Firm*—Stolowitz Ford Cowger, LLP (57) ABSTRACT

The present invention systems and methods facilitate automated efficient and effective electronic component and system failure prediction and reliability determination. A present invention electronic component reliability determination system and method includes adjustments for actual operating and environmental conditions and stress impacts on failure analysis. A reference failure rate is adjusted based upon monitored operational and environmental conditions to compensate for impacts associated with the monitored conditions. The conditions are monitored at predetermined intervals and an adjusted determination of an "instantaneous" failure rate is made. The instantaneous failure rate is utilized to ascertain a reliability index value. An electronic component reliability determination system and method can also account for infant mortality and aging effects in the determination of the reliability index value. In addition, reliability index values for both a component and a system in which the component is included can be ascertained.

31 Claims, 8 Drawing Sheets

| Historical temperature data - Flash structure<br>Block 0 - Static data ||||
|---|---|---|---|
| Block identification ||||
| This is the signature to validate the block 0 data. Checking this format FW will know data are present. The version number is necessary for every future variation of the structure.<br>The base address is : 1FC0 0000 + 2Mbytes = 1FE0 0000 ||||
| string_id | 24 | $$** __xRELIABILITY__**$$ ||
| version | 1 | Structure version number - 1 ||
| format_time | 4 | Time of Format - minutes since 1/1/70 00:00:00 ||
| blk_chksum | 2 | Block checksum ||
| reserved | 33 | Reserved for future use ||
| Time constants ||||
| These are the constant values for sampling and saving data. If the save time is greater than 1 what is saved is the average temperature read in the interval. The offset of this block is fixed at 64 bytes from the base address of the flash block. ||||
| blk_id | 2 | =0x4254 "BT" ||
| blk_chksum | 2 | Block checksum ||
| bkg_t | 1 | Time for sampling background task - $\delta$ - in minutes ||
| averagesample_t | 1 | Max time for temperature sample - $\Delta$tmaxav - multiples of $\delta$ ||
| flashsave_t | 1 | Max time to save data to Flash - $\Delta$tmaxf - multiples of $\delta$ ||
| flashclearsave_t | 2 | Max number of consecutive compress. rec. - $\Delta$nmaxcl ||
| reserved | 55 | Reserved for future use ||
| Sensors description ||||
| The sensors are listed based on the position on the list. Each one has an ID number, the 2wire channel and the 2wire address to univocally identify it. The sensor ID this parameter is the same reported in the TEMP component for the board. Every sensor will be numbered from 1 to N based on component's structure. Because we have different type of sensor it is possible that the read temperature is adjusted. For example reading the temperature for a sensor inside an ASIC gives the junction temperature so it is adjusted to get the case temperature.<br>    if $sadjt_j == 0$    $T_{eff} = Tread + sadv_j$<br>    if $sadjt_j == 1$    $T_{eff} = Tread * ( 1 + sadv_j /100 )$<br>The offset of this block is fixed at 128 bytes from the base address of the flash block. ||||
| blk_id | 2 | =0x4253 "BS" ||
| blk_chksum | 2 | Block checksum ||
| sensor_num | 1 | Number of sensors for the board - s ||
| | sensor_j | 4 | Sensor ID - $sd_j$ |
| | sensor_2w_chn | 1 | Sensor 2wire channel |
| | sensor_2w_addr | 1 | Sensor 2wire address |

| | | | |
|---|---|---|---|
| sensor_adjust_type | 1 | | Sensor reading adjustment type - sadjt$_j$<br>- 0 = absolute<br>- 1 = percent |
| sensor_adjust | 1 | *s | Sensor reading adjustment value - sadj$_j$ |
| sensor_DT_average | 1 | | Delta Temp to be considered average $\Delta$Tavth |
| sensor_DT_max | 1 | | Max Delta Temp to be recorded with comp. $\Delta$Tmaxth |

Component descriptor

One component is an HW module that can be correlated to a reliability function. Usually components are ASICs having an internal temperature sensor, but it is not limited to that. For this reason the form used to calculate the local temperature for the component is assumed of the form:

$$T_c = C + \Sigma_s cw_s T_s$$

Where $T_s$ is the temperature sampled in the generic sensor. The constant C and the weights $cw_s$ can be determined by pre-FCS measurements and multivariate analysis. The acceleration factor is then:

$$A_c(T) = \exp((1/k) \Sigma_{nf} Eaf (1/(273 + T_{ref}) - 1/(273 + T_c)))$$

| | | | |
|---|---|---|---|
| component_num | | 1 | Number of the tracked components - c |
| comp_id | | 4 | Component ID (32bit integer) |
| comp_type | | 1 | Comp Type: PortAsic, Bridge, Fabric, ... |
| comp_inst | | 1 | Comp sequential number |
| fr_ref | | 8 | Reference failure rate $\Lambda_c$ (1/hr, double) |
| spec_comp_numb | | 1 | Number of this specific component |
| comp_archit | | 1 | Component architecture csa<br>0 = serial  1 = redundant |
| actv_en_num | | 1 | *c | Number of activation energy - nf |
| actv_en | | 8*nf | Electronic failure activation energy - Eaf(c,f) - eV (double) |
| temp_accel_ref | | 1 | Reference temperature for accel. Factors $T_{ref}$ (°C) |
| temp_w_const_coeff | | 8 | Constant term for temperature definition C (double) |
| temp_w_exp_coeff | | s*8 | Weight for expansion temperature determination $cw_s$ (double) |

| Block 1-30 - Historical data |
|---|
| This part contains historical temperature data. For the format please see par. 4. |
| Block 31 - Scratch sector |
| This sector is used as scratch during erase/write of a complete data sector |

FIG. 4B

| \multicolumn{4}{c}{RAM Memory} | | | |
|---|---|---|---|
| bit-sz | Symbol | Mem-sz | Description |
| 16 | $\delta$ | 1 | Reading interval in minutes (15 min) |
| 16 | tsave | 1 | Saving values to NV time (tsave * $\delta$) |
| 32 | t1 | 1 | Limit time for infant mortality (t1 * $\delta$) |
| 32 | t2 | 1 | Limit time for wear out (t2 * $\delta$) |
| 64 | ba | 1 | Min value for $\beta$ (at t=0) |
| 64 | bb | 1 | Max value for $\beta$ (reached at t=2 * t2) |
| 8 | nf | 1 | Number of possible electronic failures |
| 64 | Eaf[ ] | nf | Activation energy per failure /8.63 10$^{-5}$ (eV/k) |
| 8 | Nj | 1 | Component number |
| 32 | CompIDj | | Identifier |
| 64 | $\Lambda$j | | Reference failure rate |
| 64 | Trefj | | Reference temperature (°K) |
| 8 | Cnumj | | Number of this specific components |
| 8 | Ttype | Nj | Temperature measurement (CaseT, indirect) |
| 8 | Carch | | Architecture (serial, redundant) |
| 64 | mj | | % of traffic factor |
| 8 | Prefj | | % of traffic reference factor (50) |
| 64 | PosFct | | Position factor |
| 64 | $\Lambda$s | 1 | System failure rate |
| 32 | t | 1 | Total ticks |
| 64 | B | 1 | Value for instantaneous $\beta$<br>B=1<br>If (t<t1) B=ba+((1-ba)/t1)*t<br>If (t>t2) B=1+((bb-1)/t2)*(t-t2) |
| 64 | Rrefj[ ] | Nj | Reference reliability index per component<br>Rrefj[j]=exp[-($\Lambda$j[j]*$\delta$*t)$^B$] |
| 64 | Rrefs | 1 | System reference reliability index<br>Rrefs=exp[-($\Lambda$s*$\delta$*t)$^B$] |
| 64 | FRrefj[ ] | Nj | Failure rate index per component<br>FRrefj[j]=($\Lambda$j[j])$^B$*B*($\delta$*t)$^{B-1}$ |
| 64 | FRrefs | 1 | System failure rate index<br>FRrefs=($\Lambda$s)$^B$*B*($\delta$*t)$^{B-1}$ |
| 64 | Ajft[ ] | Nj * nf | Accelerator factor per component per failure<br>Ajft[j,f]=exp[Eaf[f]*((1/Trefj[j])-(1/(Tj[j]+273))) |
| 64 | Ajt[ ] | Nj | Accelerator factor per component<br>Ajt[j]=$\Sigma_f$(Ajft[j,f]) |

| bit-sz | Symbol | Mem-sz | Description |
|---|---|---|---|
| 64 | Ljt[ ] | Nj | Instantaneous failure rate per component<br>Ljt[j]=Ajt[j] * Λj[j] |
| 64 | SRjt[ ] | Nj | Instantaneous contribution to the reliability index<br>SRjt[j]=(Ljt[j])$^B$ * B * ($\delta$*t)$^{B-1}$<br>SRjt[j]=SRjt[j] * exp[-(Ljt[j]*$\delta$*t)$^B$] |
| 64 | Rjt[ ] | Nj | Reliability index per component<br>Rjt[j]=Rjt[j]-SRjt[j] |
| 64 | Lst | 1 | System instantaneous failure rate<br>Lst=$\Sigma_j$(Ljt[j]) |
| 64 | SRst | 1 | System inst. contribution to the reliability index<br>SRst=(Lst)$^B$ * B * ($\delta$*t)$^{B-1}$<br>SRst=SRst * exp[-(Lst*$\delta$*t)$^B$] |
| 64 | Rst | 1 | System reliability index<br>Rst=Rst-SRst |
| 16 | BFsz | 1 | Ring buffer size |
| 16 | BFidx | 1 | Next avail. Row in ring buffer |
| 32 | tofT | BFsz | Reading time |
| 8 | Tin | | Intake Temperature (°C) |
| 8 | Tex | | Exhaust Temperature (°C) |
| 8 | Tj[Nj] | | Case Temperature per component (°C) |
| 64 | Lj[Nj] | | Inst. failure index per component |
| 64 | Ls | | System Inst. failure index |
| 64 | Rj[Nj] | | Reliability index per component |
| 64 | Rs | | System reliability index |

ELECTRONIC COMPONENT RELIABILITY DETERMINATION SYSTEM AND METHOD

FIELD OF THE INVENTION

This invention relates to the electronic component reliability. In particular, the present invention relates to field reliability monitoring of electronic components.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Often these advantageous results are achieved through the use of electronic components. To obtain desired performance results from electronic components it is usually critical for the components to operate reliably. Without reliable operation an electronic component usually does not perform properly and results are suspect.

The importance of information processed and communicated by modern electronic systems is increasing and can result in significant economic impact if the processing and communication operations are not reliable. Accurately establishing the reliability of increasingly complex and sophisticated electronic components and systems is difficult. For example, an almost insatiable desire for increased communication bandwidth and information processing capacity has led to a tremendous demand for advanced capabilities. However, even advanced electronic components usually have some probability of failure and the probability of failure typically increases as the components are used and operating conditions cause stress over time.

Traditionally, a reliability indication is estimated before a component is shipped and is typically based upon testing of a component simulating an anticipated "average condition". For example, a Medium Time Between Failures (MTBF) value estimated before shipment is based upon "average condition" assumptions. However, the "average condition" assumptions do not usually provide an accurate representation of actual in field conditions for a particular use. When a component is shipped, control over operating conditions is lost and users (e.g., customers) typically expose the electronic components to a wide variety of operating conditions.

Operating conditions have a significant impact on reliability. There are a variety of environmental and operational stresses that can detrimentally impact failure rates and reliability. For example, typically the number of "operations" electronic components perform (e.g., transistors turning on and off as data traffic passes through a communications component), the higher the likelihood of a failure because the operations usually electrically stress the components. A high temperature environmental condition also contributes to stressing the components in a detrimental manner and increases the likelihood of a failure. As a component participates in greater operational activities and diverse environments, accurately establishing the reliability of network components becomes more difficult.

Inaccurate reliability values can have numerous detrimental impacts including diminished confidence in a component. Customers often treat the reliability of a component as an asset. Components with higher reliability usually do not adversely impact revenue generating operations as often as low reliability components and high reliability components typically do not result in repair or replacement expenses as often. Customers also sometimes utilize reliability values in maintenance decisions and inaccurate reliability values can adversely impact maintenance operations.

Reliability values are often utilized as a fundamental manufacturing and/or service parameter. The reliability values can be used to predict the number of components returned for service and/or repair and the support required to address the service and/or repair demand. For example, reliability values are often utilized to forecast the amount of "spare parts" inventory to manufacture and maintain for servicing and repair operations. Furthermore, when a component is returned for servicing or repair and a component failure is identified, attempts at factoring the failure in reliability estimates are sometimes made. However, the operational and environmental conditions are not usually tracked and impacts associated with the conditions are not included in attempts to factor the failure in future pre-shipment failure estimates. Traditional attempts at establishing reliability do not usually include actual field usage information and can result in erroneous assumptions on the quality of the system, statistical behavior and future predictions.

SUMMARY

The present invention systems and methods facilitate automated efficient and effective electronic component and system failure prediction and reliability determination. A present invention electronic component reliability determination system and method includes adjustments for actual operating and environmental conditions and stress impacts on failure analysis. In one embodiment, operational and environmental conditions are monitored and a reference failure rate is adjusted (e.g., by an acceleration/deceleration factor) to compensate for impacts associated with the monitored conditions. The conditions are monitored at predetermined intervals and an adjusted determination of an "instantaneous" failure rate is made. The instantaneous failure rate is utilized to ascertain a reliability index value. An electronic component reliability determination system and method can also account for infant mortality and aging effects in the determination of the reliability index value. In addition, reliability index values for both a component and a system in which the component is included can be ascertained.

The present invention includes a variety of features that facilitate flexible and advantageous implementation. In one embodiment, a present invention electronic component reliability determination system and method also reports the operational condition measurements, environmental condition measurements, "instantaneous" failure analysis values and/or reliability determination results in a convenient format both locally (e.g., via a user graphical interface) and/or remotely (e.g., to a centralized manufacturing database). Electronic component reliability determination systems and methods of the present invention are also capable of utilizing background processing capabilities to perform many of the operational and environmental condition measurement controls, instantaneous failure rate determinations and reliability analysis. Present invention background processes have minimal or no interference with other runtime activities.

The present invention can also facilitate conservation of memory and communication resources by implementing intelligent data gathering and a variety of compression techniques. In one exemplary implementation, an electronic component reliability determination system and method senses environmental condition indication values at regular intervals and saves environmental condition indication values that have more than a minor impact. For example, an environmental condition (e.g., temperature) can be sensed at 15 minute intervals and sensed temperature values stored if the sensed temperature value indicates a statistically relevant change (e.g., more that 2 degrees) or if numerous intervals pass without recording the sensed values (e.g., save a temperature indication value every 2 hours regardless of temperature change).

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

FIGS. 4A and 4B are block diagram illustrations of one embodiment of a Flash EProm memory structure utilized in one embodiment of the present invention.

FIGS. 5A and 5B are block diagram illustrations of a RAM structure after being loaded with values a from nonvolatile memory structure in accordance with one embodiment of the present invention.

DETAILED DESCRIPTION

Reference will now be made in detail to the preferred embodiments of the invention, an electronic component reliability determination system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention facilitates efficient and effective component and system failure and reliability prediction. In one embodiment, operational and environmental conditions are monitored and a reference failure rate is adjusted (e.g., by an acceleration/deceleration factor) to compensate for impacts associated with the monitored conditions. The adjusted failure rate can be referred to as an "instantaneous" failure rate. The instantaneous failure rate is utilized to determine a reliability index value. In addition, infant mortality and aging effects can be accounted for in the reliability index value determination. The instantaneous failure rates and reliability index values can be utilized to provide a more accurate indication of a component failure probability than traditional reliability pre-shipment estimate attempts. Information provided by a present invention electronic component reliability determination system and method can also be utilized to provide an indication of system quality and statistical behavior information for use in forecasting appropriate resource levels (e.g., spare parts, labor, etc.) for maintenance, service and/or repair operations.

Figure 1:
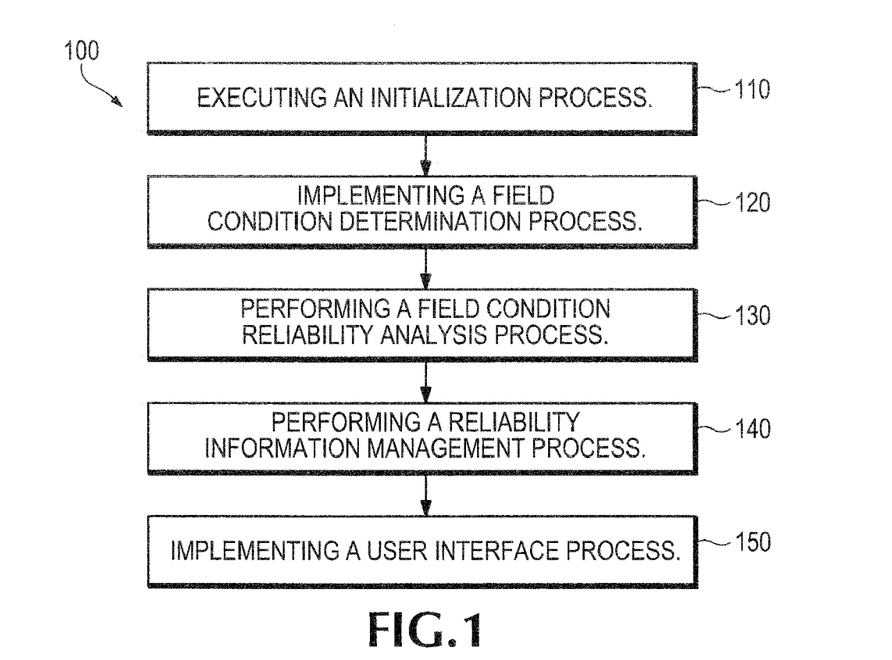
FIG. 1 is a flow chart of an electronic component reliability determination method in accordance with one embodiment of the present invention.

FIG. 1 is a flow chart of electronic component reliability determination method 100, in accordance with one embodiment of the present invention. Electronic component reliability determination method 100 determines an instantaneous failure rate and reliability index value. Compensations or adjustments for operational and/or environmental conditions, infant mortality issues and aging are factored into the determination of a reliability index value. The instantaneous failure rate and reliability index values can be ascertained on an individual electronic component basis and/or a cumulative system basis.

In step 110, an initialization process is executed. The initialization process includes installing initial settings associated with a reliability indicator. There are number of different initial settings that can be incorporated in implementations of the present invention. For example, settings can include a reference failure rate value, reference condition values, (e.g., a reference temperature, an electrical stress reference value, etc.), a condition sampling period (e.g., 15 minutes, 24 hours, etc.), and a data saving interval (e.g., how often temperature data is saved). The values of the initial settings can be determined before shipment and stored in a nonvolatile memory location (e.g., nonvolatile random access memory, flash memory, electrically erasable programmable read only memory, etc.). The integrity of the nonvolatile memory can be checked during initialization. In one exemplary implementation, the initial setting values are retrieved from the nonvolatile memory and loaded in another memory (e.g., volatile random access memory, etc.) during initialization. The initialization process can also include sensing and tracking the first startup time of a component after leaving the manufacturer (e.g., an indication of the first time a customer starts up a system). In one embodiment of the present invention, an initialization process includes starting background tasks (e.g., background tasks can include tasks performed in steps 120 and 130).

In step 120, a field condition determination process is implemented. A field condition determination process determines field conditions (e.g., environmental conditions, operational conditions, etc.) of components and systems when deployed after first customer shipment (e.g., "in the field"). In one exemplary implementation of the present invention, a field condition determination is performed at predetermined times or at regular intervals (e.g., temperature is measure at 15 minutes intervals). In one embodiment, the field condition determination process monitors field condition indication information (e.g., temperature, communication traffic, etc.) associated with a reliability indicator.

The field condition information can be represented by operational parameters and there can be a number of different operational parameters associated with a reliability indicator. For example, the operational parameters can include measurements of things that cause stress on a component or system. The present invention is capable of monitoring a variety of different stresses that can impact reliability, including environmental stresses (e.g., temperature, location, altitude, humidity, etc.) and electrical stresses (e.g., switching components on and off, power surges, electromagnetic interference, etc.). The operational parameter information can also include a measurement of the time a component is in operation. In one exemplary implementation, a measurement of the time since the electronic component first powered up after shipment from a manufacturer is tracked. A timer keeps track of timing intervals (e.g., a predetermined number of minutes) which are summed to provide a total period of time the component has been in operation. In one embodiment of the present invention, the intervals are also utilized to determine when various activities are performed (e.g., sampling a temperature reading, saving a field condition value, determining communication traffic flow, etc).

Referring still to step 120 of FIG. 1, field condition indication information can be obtained in a variety of ways. The field condition indication information can be measured directly by measuring or sensing components (e.g., temperature sensors, traffic byte counters, etc.). The field condition indication information can be obtained indirectly by deriving the information from measured information. For example, differences of temperature measurements at an air intake and an air exhaust provide an indication of how much heat the component is dissipating which in turn can provide an indication of the number of operations the component is performing. In a communication device, the number of operations a component performs can provide an indication of the amount of traffic being communicated through the device. For example, if the temperature is determined for varying ranges of communication traffic (e.g., 0% to 100% of communication capacity) at different ambient temperatures, the "field" measured values of a component temperature (e.g., "case" temperature) and the temperature read from an air intake sensor can be utilized to approximate the percent of traffic passing through the electronic component.

In step 130, a field condition reliability analysis process in preformed. A present value or "instantaneous" value of a reliability indicator is determined at a predetermined time (e.g., at regular predetermined intervals). Alternatively, the reliability indicator value can be determined if a predetermined field condition occurs (e.g., if a temperature measurement varies greater than 2 degrees, traffic communication value exceeds a predetermined value, etc). The present value or "instantaneous" value of the reliability indicator is adjusted for impacts associated with field conditions.

In one embodiment of the present invention, various different values associated with reliability determination are ascertained including a field condition failure adjustment factor (e.g., an acceleration/deceleration factor), an instantaneous failure rate for components and/or a system, and a cumulative reliability index value for a component and/or system. In one exemplary implementation, a field condition failure adjustment factor (e.g., a temperature stress adjustment factor, an electrical stress adjustment factor, etc.) is utilized to determine an instantaneous failure rate which is in turn utilized to ascertain an indication of a component and a system reliability (e.g., a cumulative reliability index value). The field condition reliability analysis process can also provide a probability of failure and reliability index indication that is adjusted for life cycle stage (e.g., infant mortality boundaries, end of life boundaries, etc.) considerations and aging issues.

In step 140, a reliability information management process is performed. The reliability information management process manages the disposition of reliability related information. In one exemplary implementation, the reliability related information (e.g., field condition information, instantaneous failure rates, cumulative reliability index information, etc.) is stored in a memory location. For example, a non-volatile memory (e.g., a Flash EProm) can be utilized to store various different operational parameter information.

The reliability related information is communicated remotely to a centralized resource (e.g., a manufacturing database) via a network for analysis and interpretation in one embodiment of the present invention. Alternatively, the information can be downloaded from memory when a system is removed from deployment (e.g., when the system is returned to a manufacturer). The reliability related information can be utilized to project or estimate maintenance, service and/or repair demand (e.g., spare parts inventory, etc.). The reliability related information can also be utilized to "update" various reliability statistics and reference values. A reliability information management process can also forward reliability related information (e.g., temperature measurements and other reliability related information or temperature measurements alone) to an interface in a user interface process.

In step 150, a user interface process is implemented. The user interface process presents reliability related information in a convenient and correlated manner. A customer can utilize an interface provided by the interface process to examine the impact of operating conditions on reliability and to project maintenance timing. A manufacturer can also utilize the information to provide services and/or support to a customer. An interface process can also include changing the values of initialized settings for a variety of items, including field condition sampling intervals and reference temperatures.

In one embodiment of the present invention, performing a field reliability analysis includes a system reliability analysis. The failure rates of the components are utilized in the system reliability analysis to provide a system reliability indicator. In determining the reliability index of the system in terms of the system components, the present invention can include compensations for the configuration (e.g., redundancy) of the components within the system. In one exemplary implementation in which the components are arranged with a serial structure and the failure of one of the components stops processing through the serial structure or "chain" (e.g., the components are not redundant), a system reliability index value at a particular time is the product of reliability index values of the components. For example:

$$R(t) = \prod_{i=1}^{n} R_i(t)$$

where the system reliability index at a particular time t is R(t), reliability index value of a component i at time t is $R_i(t)$ and n is number of non-redundant components. This is a simple relation between the system MTBF and the components' MTBF. If system components are arranged in a configuration in which the failure of one of the components does not stop the chain, the analysis of the system redundant value is different. For example, the value is defined by:

$$R(t) = 1 - \prod_{i=1}^{n}(1 - R_i(t))$$

In addition, the reliability index can be calculated for the redundant components and resulting values can be used in the serial calculation above.

Figure 2:
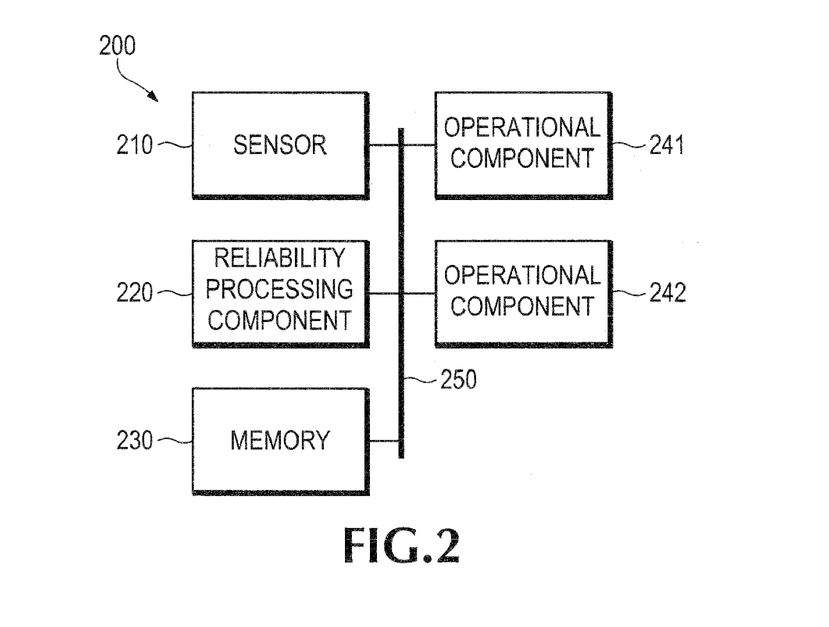
FIG. 2 is a block diagram illustration of an electronic component reliability determination system in accordance with one embodiment of the present invention.

FIG. 2 is a block diagram illustration of an electronic component reliability determination system 200 in accordance with one embodiment of the present invention. Electronic component reliability determination system 200 comprises sensor 210, reliability processing component 220, memory 230 and communication bus 250. Electronic component reliability determination system 200 determines the "instantaneous" failure rates and cumulative reliability of operation components 241 and 242. Communication bus 250 communicatively couples sensor 210, reliability processing component 220, memory 230, and operational components 241 and 242.

Sensor 210 participates in sensing operational parameter information. In one embodiment, the operational parameter information is associated with operational environmental conditions. For example, sensor 210 can sense temperature. Sensor 210 is readily adaptable for a variety of configurations. For example, sensor 210 can include a diode inside a component (e.g., inside a component's case) and the diode is utilized to measure temperature. The temperature is derived based upon resistance encountered in passing a current through the diode and measuring the resulting voltage. Sensor 210 can be an ambient temperature measuring device that measures ambient temperature. The sensor 210 can also include air intake and exhaust temperature measuring components.

It is appreciated that sensor 210 can be configured to sense a variety of operational parameter information. For example, sensor 210 can be configured to sense altitude. Alternatively sensor 210 can be configured to sense electrical stress related measurements. For example, sensor 210 can be configured to sense a variety of electrical stress related items, including voltage, current, processing activities, and communication activities (e.g., sense the number of bytes of communication traffic, etc.).

Reliability processing component 220 performs instructions associated with ascertaining a field condition adjusted reliability value (e.g., an instantaneous reliability value). In one embodiment, a field adjusted reliability index value is defined by:

$$R_j(t) = 1 - \int_0^\infty \lambda_j^\beta \beta s^{\beta-1} \exp[-(\lambda_j s)^\beta] ds$$

where $\lambda$ is the instantaneous failure rate coefficient and $\beta$ is a life cycle shape factor. Reliability processing component 220 can also perform instructions to obtain a cumulative reliability indication value. For example, a cumulative reliability indication value can be defined by:

$$R_j(t) = 1 - \sum_{k=1}^{M} \lambda_{jk}^\beta \beta \delta(k\delta)^{\beta-1} \exp[-(\lambda_{jk} k\delta)^\beta]$$

where $\delta$ is a time interval (e.g., a sampling interval).

The life cycle stage shape factor beta ($\beta$) defines boundary conditions for the life stages of a component or system. In one embodiment, $\beta$ takes into account reliability impacts associated with infant mortality issues and system aging issues. One exemplary definition of $\beta$ is given by:

$$\beta = \begin{cases} V_a + \dfrac{1-V_a}{T_1}t & t < T_1 \\ 1 & T_1 < t < T_2 \\ 1 - \dfrac{1-V_b}{T_\infty - T_2} & t > T_2 \end{cases}$$

where the infant mortality interval or stage is 0 to time T1 and the end of life interval or stage is the interval from T2 to T infinity. The operational life cycle stage is the interval time T1 to time T2. In one exemplary implementation of the present invention, the value of $\beta$ is less than 1 for the infant mortality stage, 1 for the operational life cycle stage and greater than one for the end of life stage. In one embodiment, the value of $\beta$ is stored in a nonvolatile part of memory 230.

Reliability processing component 220 also performs instructions for determining an instantaneous failure rate ($\lambda_i$). In one exemplary implementation of the present invention, the instantaneous failure rate is defined by:

$$\lambda_i = A_i S_i \Lambda_i$$

where $\lambda_i$ is the instantaneous failure rate, $A_i$ is the temperature stress adjustment value, $S_i$ is the electrical stress adjustment value and $\Lambda_i$ is a base or reference failure rate. It is appreciated that there can be a variety of different stress adjustment factors. For example, there can be a stress adjustment factor for each measured field condition (e.g., temperature, humidity, altitude, etc.)

In one exemplary implementation, the temperature stress adjustment factor is established in accordance with the following definition:

$$A_i = \frac{\lambda_i}{\Lambda_j} = \exp\left[\frac{E_a}{k}\left(\frac{1}{T_{ref}} - \frac{1}{T_{op}}\right)\right]$$

where $E_a$ is a thermal activation energy for a defect (eV), k is Boltzmann's constant (8.63 10−5 eV/K), $T_{ref}$ is a reference temperature and $T_{op}$ is an operating temperature (e.g., measured by sensor 210). In one exemplary implementation, the activation energy is specific for the defect considered. An electrical stress adjustment factor can be established in accordance with the following definition:

$$S_i = \exp[m_i(P_{op} - P_{ref})]$$

where $P_{op}$ is the percent of the stress applied (e.g., traffic calculated) and $P_{ref}$ is a percent (e.g., 50%) used in the reference measurement of the MTBF. The variable $m_i$ is an electrical stress parameter characteristic of the component and can be predetermined (e.g., saved in memory 230 as a reference value).

In one exemplary implementation in which the reference temperature is 313 degrees Kelvin, the operating temperature is 333 degrees Kelvin and the activation energy is 0.4 eV (e.g., an average value for silicon or oxide defects), the temperature stress adjustment factor is 2.4. Therefore, the instantaneous failure rate for the electronic component is 2.4 times higher than the reference failure rate. Alternatively, this can also be expressed by indicating that these two hours are like 4.8 effective hours at MTBF or that the MTBF for these two hours is 2.4 times less than the given MTBF.

Figure 3:
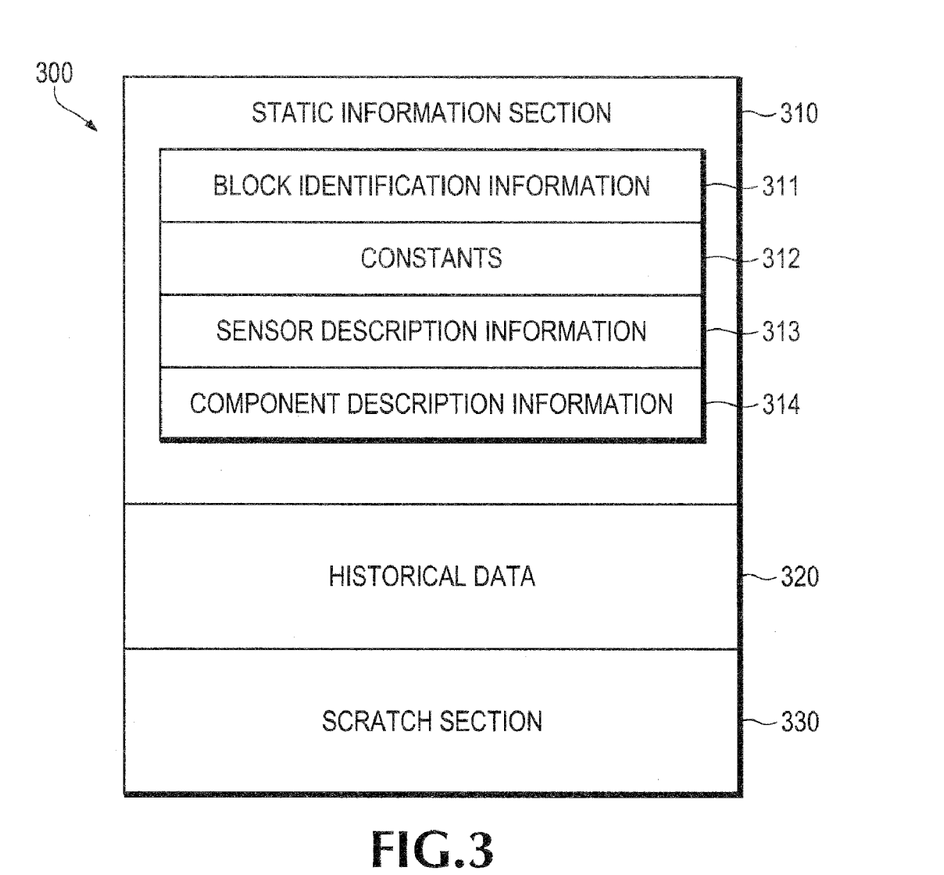
FIG. 3 is block diagram illustration of an exemplary present invention nonvolatile memory configuration.

Memory 230 can include a variety of configurations. In one embodiment, memory 230 includes nonvolatile memory for storing static reference information and historical data. FIG. 3 is block diagram illustration of illustration of nonvolatile memory structure 300, one embodiment of a nonvolatile portion of present invention memory 230. Nonvolatile memory structure 300 comprises static information section 310, historical data section 320, and scratch section 330. Static information section 310 stores static information including reference values and sampling interval duration values. In one embodiment, static information section 310 includes block identification section 311, constants section 312, sensor description section 313 and component description section 314. Historical data section 320 stores historical data including results of a field condition determination process (e.g., temperature, location, altitude, humidity, switching components on and off, power surges, electromagnetic interference, etc.). The historical data can also include values resulting from a field condition reliability analysis process (e.g., an "instantaneous" value of a reliability indicator adjusted for impacts associated with field conditions can be received). Scratch section 330 stores information during erase/write of data (e.g., a data sector).

Figure 5B:
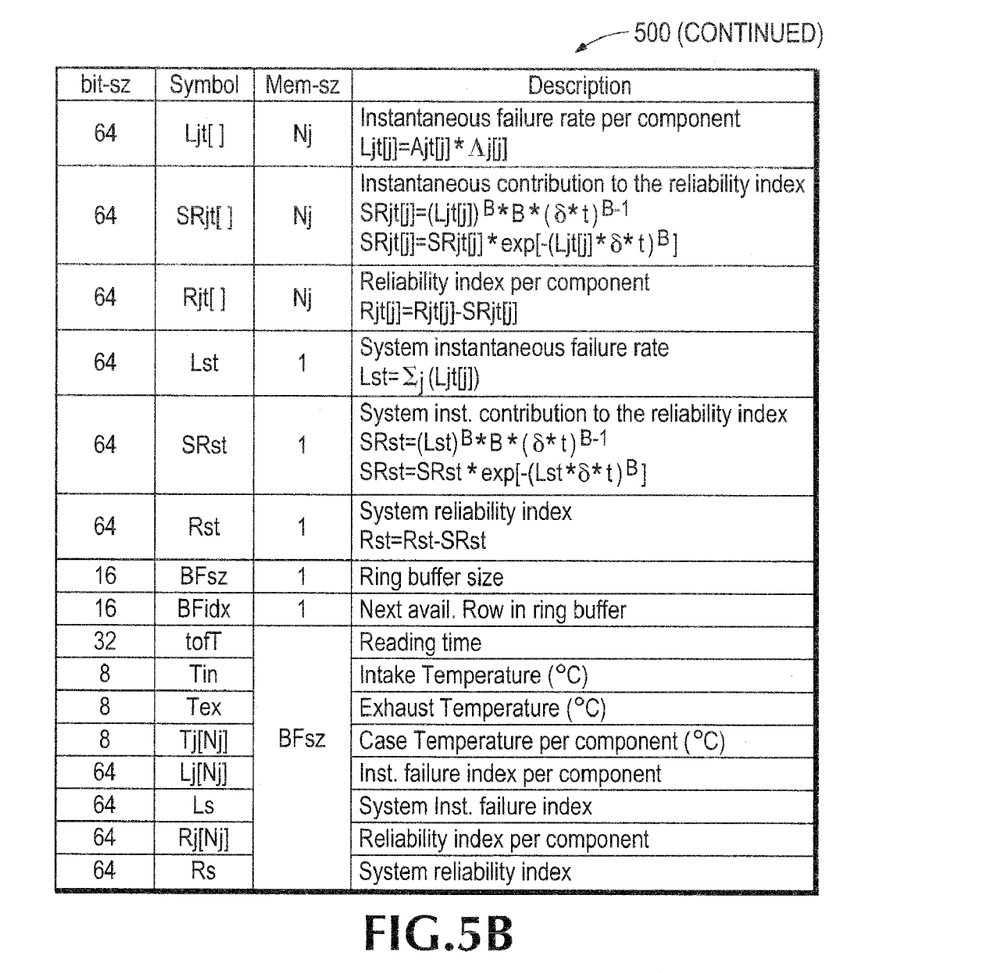

FIGS. 4A and 4B are block diagram illustrations of nonvolatile Flash EProm memory structure 400, one exemplary implementation of a present invention memory 230. FIGS. 5A and 5B is block diagram illustration of one embodiment of a RAM structure 500, an embodiment of a volatile portion of memory 230 after being loaded with values from a nonvolatile memory structure, in accordance with one embodiment of the present invention memory.

Figure 8:
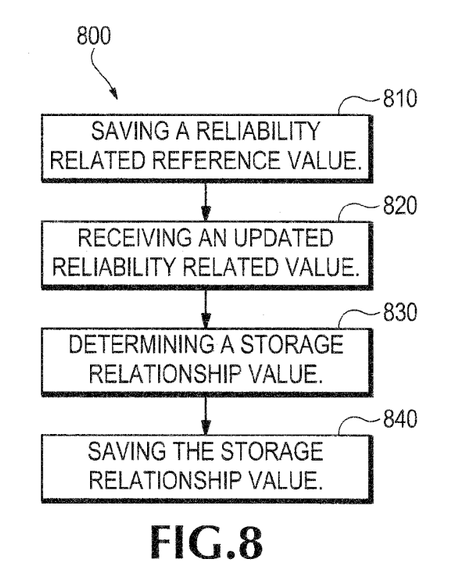
FIG. 8 is a flow chart of a reliability information condensing method in accordance with one embodiment of the present invention.

In one embodiment of the present invention, information associated with reliability determination is saved in a condensed format. FIG. 8 is a flow chart of reliability information condensing process 800, in accordance with one embodiment of the present invention. In one exemplary implementation, the condensed format includes saving a reference value and the difference between the reference value and a measured value. For example, a reference temperature (e.g., 40 degrees C.) is saved and then the difference (e.g., 20 degrees C.) from a measured value (e.g., 40 degrees C.) at a particular sampling time is saved. In one embodiment, the temperature differences that exceed a predetermined value are saved and differences that do not exceed the predetermined difference are not saved.

In step 810, a reliability related reference value is saved. It is appreciated that the present condensation method is readily applicable to a variety of reliability related references values. For example, a possible related reference values include a reference temperature, an initial start up time after shipment from the manufacturer, a communication traffic reference value, a humidity reference value, and/or an altitude reference value.

In step 820, an updated reliability related value is received. In one embodiment, the updated reliability related value is a result of implementing a field condition determination process (e.g., results of step 120 of electronic component reliability determination method 100). For example, the results of the field condition determination process can be expressed as operational parameters which can include measurements of things that cause stress on a component or system (e.g., temperature, location, altitude, humidity, switching components on and off, power surges, electromagnetic interference, etc.). In addition, a count of the sampling periods can be received.

In one exemplary implementation, the updated reliability related value can include values resulting from a field condition reliability analysis process (e.g., results of step 130 of electronic component reliability determination method 100). For example, a present value or "instantaneous" value of a reliability indicator adjusted for impacts associated with field conditions can be received. The updated reliability related value can including a field condition failure adjustment factor, an instantaneous failure rate for components and/or a system, and a cumulative reliability index value for a component and/or system.

In step 830, a storage relationship value is determined. The storage relationship value is value associated with a relationship between the updated reliability related value and the reliability related reference value. The relationship is a predetermined relationship. For example, the storage relationship value can be the difference between the updated reliability related value and the reliability related reference value. The difference can be direct or incremental. For example, if a reliability related reference value is a reference temperature of 40 degrees Celsius and an updated reliability related value is a measured temperature of 60 degrees Celsius the storage relationship value can be 20 degrees Celsius. Alternatively, a predetermined incremental differential can be established (e.g., 5 degrees Celsius) and the storage relationship value (e.g., 4) is based upon an incremental count (e.g., an increment count of 4 instead of a difference of 20 degrees Celsius). The storage relationship value can also be a count of sampling periods.

In step 840, the storage relationship value is saved. The storage relationship value can be stored in a non-volatile memory location. In one exemplary implementation, the storage relationship value is stored in a reliability information table "format". The reliability information tables can be utilized to store a variety of measured values (e.g., temperature measurements, humidity values, altitude values, etc.). The stored values (e.g., temperature measurements) can also be utilized in the determination of the other reliability information (e.g., instantaneous failure rates, reliability index values, etc.) which can also be saved in a present invention compression format (e.g., a base or reference value and differential increments).

Figure 9A:
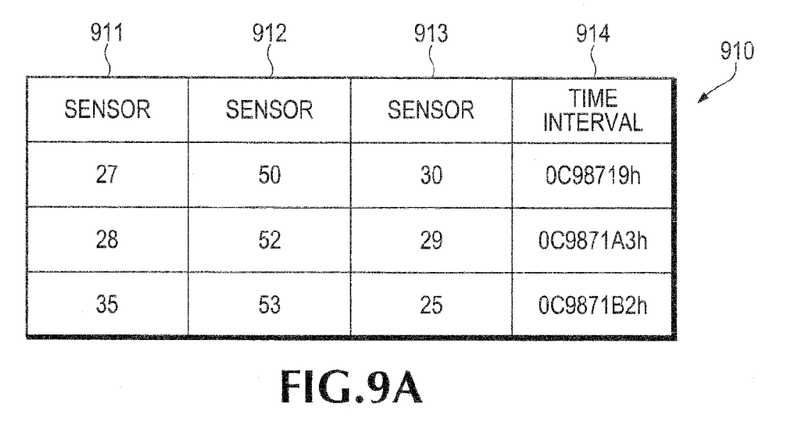
FIG. 9A is an illustration of an exemplary reliability information table.

FIG. 9A is an illustration of a reliability information table 910, one example of information that can be condensed in accordance with an embodiment of the present invention. The columns represent different updated reliability related information (e.g., measurement from sensors, sampling time intervals) and the rows represent the values of the different updated reliability related information. For example, the first, second and third columns are measurements from sensor 911, 912, and 913 respectively and the forth column is a time interval count 914. The rows of data (second, third and forth rows of the illustration) are the measured values from the respective sensors at different times. In one embodiment, the first row of data is a base measurement from which the following rows are measured from The first time can be an absolute time designated in month/day/year and hours, minutes and seconds (mm/dd/yy hh:mm:ss). For example the time 6/10/03 10:20:00 can be expressed as the number of minutes elapsed from 1/1/70 00:00:00 which is 211217140 or in hexidecimal form is OC987194.

Figure 9B:
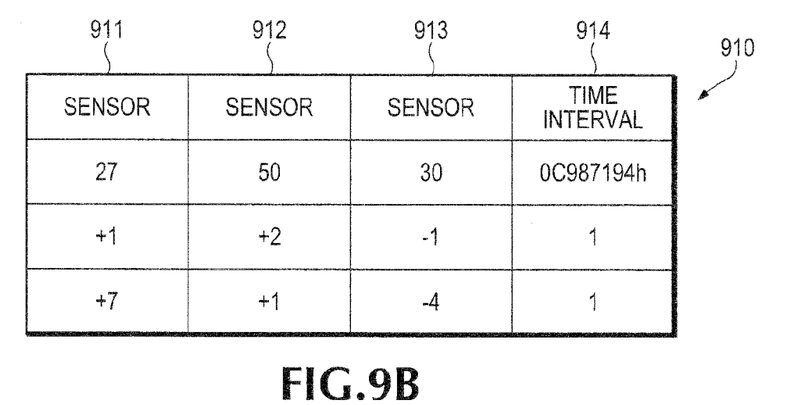
FIG. 9B is another illustration of a condensed reliability information table in accordance with one embodiment of the present invention.

FIG. 9B is another illustration of condensed reliability information table 910 in accordance with one embodiment of the present invention. The values stored in the second and third rows of data (the third and forth row of the illustration) are the differences in the sensed values from the previous time interval. Alternatively, the values can be the difference from the reference value. In the present example, the sampling interval time is fifteen minutes. The present invention is readily adaptable for storing a combination of regular or clear data and compressed data. For example, the first row of data can be clear values (e.g., an absolute value, an actual measurement, a fully expressed time, etc.) and the second and third row of data (third and forth row of the illustration) can be compressed values (e.g., the difference of a measured value from the previous value).

Figure 9C:
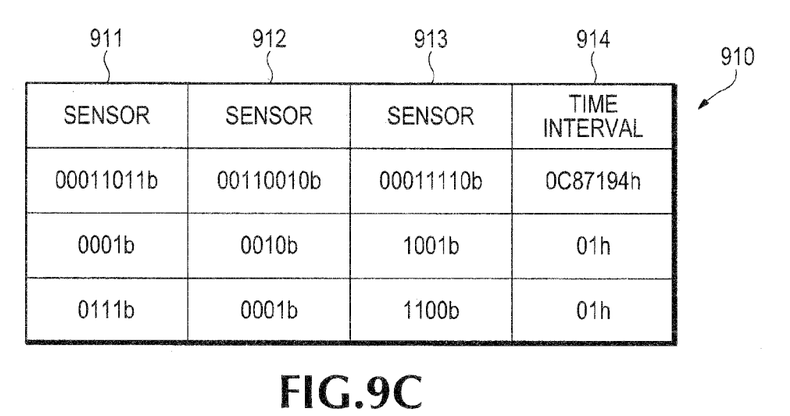
FIG. 9C is an illustration of a condensed reliability information table with binary values in accordance with one embodiment of the present invention.

FIG. 9C is an illustration of a condensed reliability information table 910 with binary values in accordance with one embodiment of the present invention. The condensing conserves memory space. For example, in the first column third row, instead of using 8 bits to represent the value 28, 4 bits are used to represent the difference from 27. The first bit of the values in the third and forth row indicate whether the difference is positive or negative. For example, a logical 0 can represent positive and a logical 1 can represent negative, or vise versa. In the illustrated example the time does not have a sign value as it is assumed to be positive (e.g., the increments do not go back in time).

Figure 6:
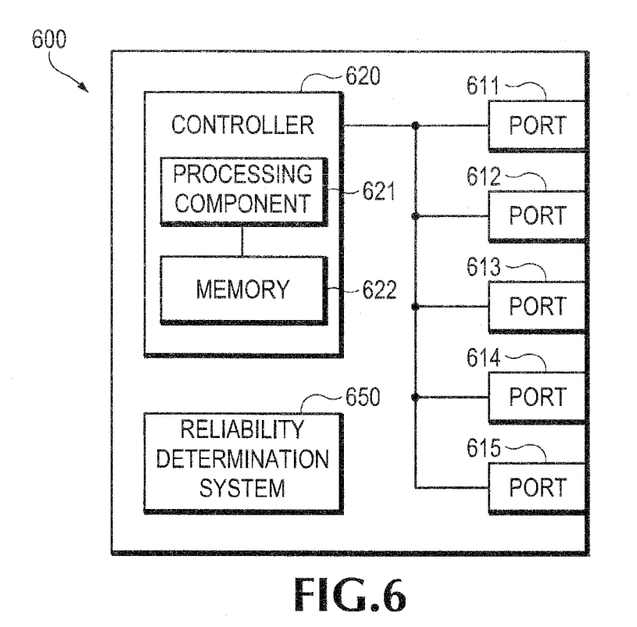
FIG. 6 is a block diagram of an exemplary communication device implementation of the present invention.

FIG. 6 is a block diagram of a communication device 600 in accordance with one embodiment of the present invention. It is appreciated that communication device 600 is readily adaptable for a variety of communication activities including routing communication information. Communication device 600 includes controller 620, ports 611 through 615, and reliability determination system 650. Controller 620, ports 611 through 615, and reliability determination system 650 are communicatively coupled. Controller 620 controls supervisory and non-supervisory communication activities for communication ports 611 through 615. Reliability determination system 650 determines the "instantaneous" failure rates and cumulative reliability of controller 620 and ports 611 through 615. In one embodiment of the present invention, reliability determination system 650 includes instructions for determining the "instantaneous" failure rates and cumulative reliability. Alternatively, instructions for determining the "instantaneous" failure rates and cumulative reliability can be stored in memory 622 and processed by processing component 621 in addition to instructions for controlling communications through communication device 600.

Figure 7:
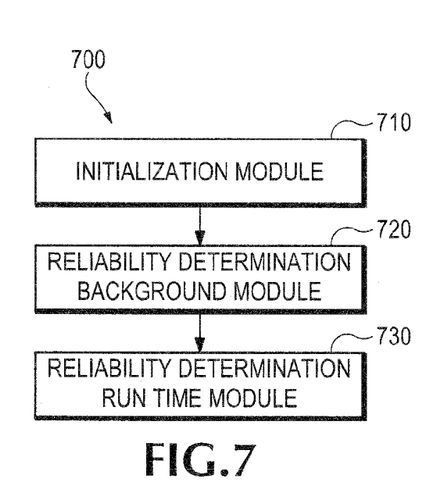
FIG. 7 is a block diagram illustration of a reliability determination hierarchy in accordance with one embodiment of the present invention.

In one embodiment, an electronic component reliability determination hierarchy is established for directing reliability determination activities. FIG. 7 is a block diagram illustration of reliability determination hierarchy 700 in accordance with one embodiment of the present invention. Reliability determination hierarchy 700 includes initialization module 710, background module 720 and run time module 730. The components of reliability determination hierarchy 700 cooperatively operate to direct reliability determination activities.

Initialization module 710 directs implementation of an initialization process. In one embodiment, initialization module 710 includes instructions for checking the integrity of non volatile memory, initializing random access memory (RAM) with previously stored values (e.g., initial settings stored in a nonvolatile memory), defining a reliability sampling period or interval and starting background tasks.

Background module 720 directs reliability determination background operations. For example, background module 720 can direct background operations associated with a field condition determination process and a field condition reliability analysis process. In one embodiment, background module 720 includes instructions for implementing reliability associated firmware activities. Background module 720 can divide background tasks into multiple background threads that operate separately and do not interfere with one another. For example, one background task thread is started to gather field condition information (e.g., perform a field condition determination process) and a secondary background task is started to analyze data (e.g., performing a field condition reliability analysis process). In one exemplary implementation, the secondary background task can be performed in an time less than a first background task interval (e.g., a temperature measuring interval). The fist background process can run without interference from the secondary background process (e.g., the first background task does not have to wait for a processor to complete the secondary background task).

Runtime module 730 provides an interface to an operating system and messaging features. For example, field condition information and/or reliability indication information can be communicated to a remote resource. In one exemplary implementation, reliability determination activities (e.g., calculation of instantaneous failure rates, etc,) can be performed by the runtime module 730 also. In one embodiment, the instructions of reliability determination hierarchy 700 are stored on a computer readable medium and cause a processor to implement reliability determination operations.

Thus, the present invention provides a convenient and accurate indication of failure rates and reliability indications. A highly relevant field adjusted indication of the mean time between failure (MTBF) is also provided. The present invention facilitates increased accuracy in predicting and estimating maintenance, service and repair activities and resources. For example, better indications of spare part inventories can be forecasted with reliability information provided by the present invention. The reliability information made available by the present invention can also be used to modify existing reference values and/or in future design decisions.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus comprising:
   one or more processors; and
   a memory coupled to the processors comprising instructions executable by the processors, the processors operable when executing the instructions to:
   identify an inputted reference failure rate for a monitored device, the inputted reference failure rate being a first quotient of an amount of failures associated with a population of the monitored device and an amount of time, the inputted reference failure rate associated with an expected operating temperature for the monitored device and an expected communication capacity utilization for the device;

communicate with the monitored device while the monitored device is in field operation for determining an actual operating temperature for the monitored device and an actual communication capacity utilization;

determine a temperature stress adjustment factor using the expected operating temperature and the actual operating temperature;

determine an electrical stress adjustment factor using the expected communication capacity utilization and the actual communication capacity utilization, wherein the processors are further operable to determine the electrical stress adjustment factor by calculating a difference of the expected communication capacity utilization and the actual communication capacity utilization; and output an instantaneous failure rate that is a first mathematical product of the inputted reference failure rate, the temperature stress adjustment factor and the electrical stress adjustment factor.

2. The apparatus of claim 1 wherein determining the temperature stress adjustment factor further includes determining a difference of a first reciprocal of the expected operating temperature and a second reciprocal of the actual operating temperature.

3. The apparatus of claim 2 wherein the processors are further operable to determine the temperature stress adjustment factor by calculating a second mathematical product of the difference and a second quotient of a predetermined thermal activation energy for the monitored device and Boltzmann's constant.

4. The apparatus of claim 1 wherein the processors are further operable to determine the electrical stress adjustment factor by calculating a second mathematical product of the difference and a predetermined electrical stress characteristic of the monitored device.

5. The apparatus of claim 1 wherein the apparatus is integrated with a router and the monitored device is a communication component located in the router.

6. The apparatus of claim 5 wherein the outputted instantaneous failure rate corresponds to the communication component.

7. The apparatus of claim 6 wherein the processors are further operable to use the instantaneous failure rate for the communication component to determine an instantaneous failure rate for the router.

8. The apparatus of claim 1 wherein the instantaneous failure rate for the monitored device is outputted to a display device.

9. The apparatus of claim 1 wherein the processors are further operable to:

check the integrity of non volatile memory used to store the inputted reference failure rate, the expected operating temperature and the expected communication capacity utilization;

initialize random access memory (RAM) with previously stored values;

define a reliability sampling period or interval; and start background tasks.

10. The apparatus of claim 1 wherein the monitored device is located remotely with respect to the apparatus and the apparatus is operable to communicate with the monitored device over a network.

11. The apparatus of claim 1 wherein the processors are further operable to communicate with a traffic byte counter coupled to the monitored device to determine the actual communication capacity utilization.

12. The apparatus of claim 1 wherein the processors are further operable to determine a cumulative reliability indication value by summing the instantaneous failure rate with other instantaneous failure rates for the monitored device that are determined by the apparatus periodically according to a predefined period.

13. The apparatus of claim 1 wherein the processors are further operable to output a field-adjusted Mean Time Between Failures (MTBF) for the monitored device that is determined by adjusting a predetermined MTBF for the monitored device using the actual operating parameters that are measured while the monitored device is used for non-testing purposes in a field environment.

14. The apparatus of claim 1 wherein the outputted instantaneous failure rate is associated with a Mean Time Between Failures (MTBF) for the monitored device.

15. A system comprising:

means for inputting a first predetermined Mean Time Between Failures (MTBF) for a monitored device, the first predetermined MTBF based on expected environmental conditions and expected usage parameters for the device;

means for measuring actual temperature while the device is being operated in the field;

means for identifying actual electrical stress on the monitored device by comparing the actual communication capacity utilization to an expected communication capacity utilization;

means for determining a second field-adjusted MTBF for the monitored device, the second field-adjusted MTBF determined by adjusting the first predetermined MTBF according to both a first factor representing a difference between the field-measured actual temperature and an expected operating temperature and a second factor representing a difference between the identified electrical stress and expected electrical stress for the device, the second field-adjusted MTBF being different than the first predetermined MTBF; and means for outputting the second field-adjusted MTBF.

16. The system of claim 15 wherein the measurements of the actual temperature and the actual communication capacity utilization are initiated automatically after passage of a predefined time interval.

17. The system of claim 16 wherein the measurements are taken over a predefined duration.

18. The system of claim 15 further comprising:

means for determining an instantaneous failure rate by adjusting a reference failure rate for the device according to measurements;

means for automatically re-determining the instantaneous failure rate after passage of a predefined time interval; and means for identifying a cumulative reliability indication value for the monitored device by summing the initial instantaneous failure rate and the re-determined instantaneous failure rate.

19. The system of claim 15 wherein the expected environmental conditions include expected operating humidity and expected operating ambient temperature.

20. The system of claim 15 wherein the expected usage parameters are based on an expected amount of power cycles applied to the monitored device.

21. The system of claim 15 wherein the expected temperature is an expected operating temperature.

22. The system of claim 15 wherein the expected temperature is an expected ambient temperature.

23. A computer readable medium with instructions embedded therein for causing a processor to implement a reliability determination process including:

an initialization module for directing implementation of an initialization process;

a determination process and a field condition reliability analysis process for determining one or more operational parameters of a component, the operational parameters determined at least in part by calculating an electrical stress adjustment factor that represents a difference between an expected communication capacity utilization for the component and an actual communication capacity utilization that is based on an output of a traffic byte counter corresponding to the component;

a reliability determination runtime module for interfacing with an operating system to calculate one or more field-adjusted Mean Time Between Failures (MTBFs) by adjusting a reference MTBF for the component using the operational parameters and to calculate one or more cumulative reliability index values based on the field-adjusted MTBFs; and an output module for causing the calculated cumulative reliability index values to be displayed to a user.

24. The computer readable medium of claim 23 wherein said initialization module includes instructions for:

checking the integrity of non volatile memory;

initializing random access memory (RAM) with previously stored values;

defining a reliability sampling period or interval; and a background module for starting background tasks.

25. The computer readable medium of claim 24 wherein said background module includes instructions for implementing reliability associated firmware activities.

26. The computer readable medium of claim 24 wherein said background module divides the background tasks into multiple background threads that operate separately.

27. A method comprising:

identifying a reference failure rate for a device, the reference failure rate usable for calculating a time between failures statistic associated with the device and based on expected operating parameters for the device;

measuring actual operating parameters for the device while the device is operated for non-testing purposes in a field environment for the device, the actual operating parameters including a measured actual communication capacity utilization for the device;

determining an electrical stress adjustment factor according to a comparison of the actual communication capacity utilization to an expected communication capacity utilization for the device;

determining a custom failure rate by adjusting the reference failure rate based at least in part on the determined electrical stress adjustment factor;

outputting a signal for displaying the custom failure rate; and outputting a field-adjusted Mean Time Between Failures (MTBF) for the device that is determined by adjusting a predetermined MTBF for the device using the actual operating parameters that are measured while the device is operated for the non-testing purposes in the field environment.

28. The method of claim 27 wherein the measured operating parameters are transferred over a network for remote analysis.

29. The method of claim 27 wherein the device is a communication component located in a router.

30. The method of claim 27 wherein the custom failure rate is an instantaneous failure rate for the device measured at a first time and the custom failure rate is summed with other instantaneous failure rates for the device that are measured at second other times to generate a cumulative reliability indication.

31. The method of claim 27 wherein measuring actual operating parameters includes monitoring the actual communication capacity utilization for the device.

* * * * *

UNITED STATES PATENT AND TRADEMARK OFFICE
CERTIFICATE OF CORRECTION

| | | |
|---|---|---|
| PATENT NO. | : 7,457,725 B1 | |
| APPLICATION NO. | : 10/603382 | |
| DATED | : November 25, 2008 | |
| INVENTOR(S) | : Civilini | |

It is certified that error appears in the above-identified patent and that said Letters Patent is hereby corrected as shown below:

At column 14, line 26, please replace "being operated in the field;" with --being operated in the field; ¶ means for measuring actual communication capacity utilization of the device while the device is being operated in the field;--.

Signed and Sealed this

Fourteenth Day of April, 2009

JOHN DOLL
*Acting Director of the United States Patent and Trademark Office*